United States Patent [19]

Swanson

[11] Patent Number: 5,711,139
[45] Date of Patent: Jan. 27, 1998

[54] SELF-LEVELING HILLSIDE MOWER WITH REMOTE CONTROL

[76] Inventor: Floyd R. Swanson, 4704 W. Mt. Vernon Rd., Cedar Falls, Iowa 50613

[21] Appl. No.: 626,153

[22] Filed: Apr. 4, 1996

[51] Int. Cl.⁶ .................................................. A01H 75/28
[52] U.S. Cl. ..................... 56/10.2 R; 280/6.1; 172/4
[58] Field of Search ........................ 516/102 F, 102 R, 516/DIG. 15, 7, 6; 172/4, 4.5, 7, 710; 180/41, 401; 280/6.1

[56] References Cited

U.S. PATENT DOCUMENTS

| | | |
|---|---|---|
| 3,876,012 | 4/1975 | Regier ............................ 172/4 |
| 4,043,102 | 8/1977 | Uhlinger et al. .................. 56/17.4 |
| 4,249,630 | 2/1981 | Lougheed et al. ............... 180/168 |
| 4,551,801 | 11/1985 | Sokol . |
| 4,558,760 | 12/1985 | Lestradet . |
| 4,707,971 | 11/1987 | Forpahl et al. ................... 56/6 |
| 4,714,140 | 12/1987 | Hatton et al. ................ 180/167 X |
| 4,964,265 | 10/1990 | Young . |
| 4,988,974 | 1/1991 | Fury et al. ......................... 340/431 |
| 5,176,391 | 1/1993 | Schneider et al. ............. 180/41 X |
| 5,325,650 | 7/1994 | Fuse et al. ........................ 56/10.2 |
| 5,351,778 | 10/1994 | Shigemi et al. . |

*Primary Examiner*—Randolph A. Reese
*Assistant Examiner*—Robert Pezzuto
*Attorney, Agent, or Firm*—James C. Nemmers

[57] ABSTRACT

A self-leveling system for a multi-purpose vehicle used primarily for off the road operations such as roadside mowing. The vehicle frame and operator's station will automatically remain substantially level on sidehills, and if a slope greater than a predetermined amount is encountered, the operator will be given a warning signal which, if ignored, will result in the shut-down of the vehicle's operating system and the vehicle will stop. If the operator chooses, the vehicle can be operated from a remote location after the warning signal is received.

3 Claims, 2 Drawing Sheets

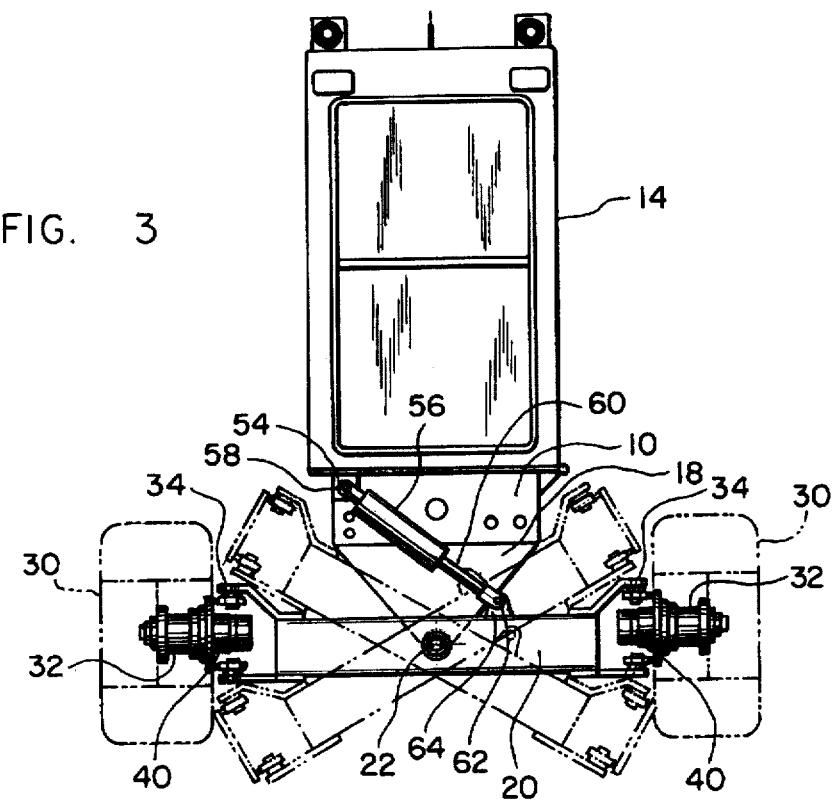
FIG. 3
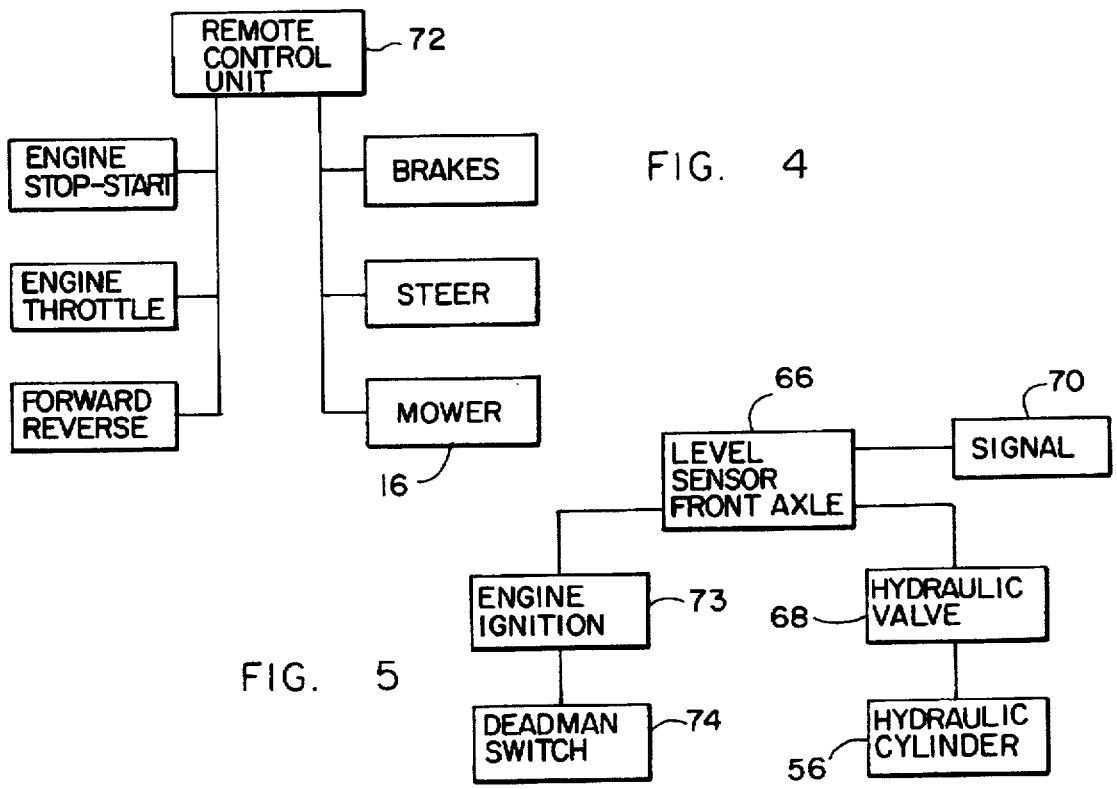
FIG. 4
FIG. 5

SELF-LEVELING HILLSIDE MOWER WITH REMOTE CONTROL

BACKGROUND OF THE INVENTION

With the many, many miles of roads that exist to accommodate all types of vehicles, roadway maintenance has become a time consuming and sometimes difficult task. There are known and used a number of specialized types of equipment designed and used by governmental agencies and commercial operators to mow and otherwise maintain the roadways. Because of the wide variety of terrain along roadsides, roadway maintenance is potentially hazardous to operators of mowing equipment, especially in areas were the terrain has steeply sloped hillsides. Since the right-of-ways along roadways, including interchanges, frequently have slopes of greater than 28°, operators must be extremely careful and use good judgment in operating equipment on steep hillsides to avoid tipping over the equipment and injuring the operator, sometimes seriously. Although operators attempt to avoid hazardous situations by mowing techniques, even experienced operators can suddenly find themselves in a situation on a side hill in which they lose control without any warning.

There is therefore a need for improved mowing equipment that can be safely operated on side hills, and if a slope is encountered that presents a potential hazard, a warning signal will be given to the operator. Moreover, since even the steepest side hill slopes must be maintained, there is a need for equipment that can be safely operated from a remote location to mow such sidehills.

SUMMARY OF THE INVENTION

The apparatus of the invention includes an operator's station located on a frame that is in turn mounted on four wheels that are hydrostatically driven. The mower or other attachment is attached to the front axles. The operator's station and frame are pivotly secured to the axles, and movement of the front axle is controlled by a hydraulic cylinder while the rear axle is free floating. A sensors detects the level of any sidehill slope and through the hydraulic system, controls the hydraulic cylinder to keep the frame substantially horizontal and the operator's station upright. The sensor will also cause actuation of an audible and a visual warning signal if the slope reaches a predetermined degree of incline, at which time the operator is warned to stop the mower and operate the unit from a remote location using a remote control box. If the operator ignores the warning, the sensor will detect when the sidehill slope reaches a greater degree of incline at which time the mower will be completely shut down.

BRIEF DESCRIPTION OF THE DRAWING

FIG. 3 is a front elevational view of the unit;

FIG. 4 is a schematic diagram of the level sensing system; and

FIG. 5 is a schematic diagram of the remote control unit.

DESCRIPTION OF THE PREFERRED EMBODIMENT OF THE INVENTION

Figure 1:
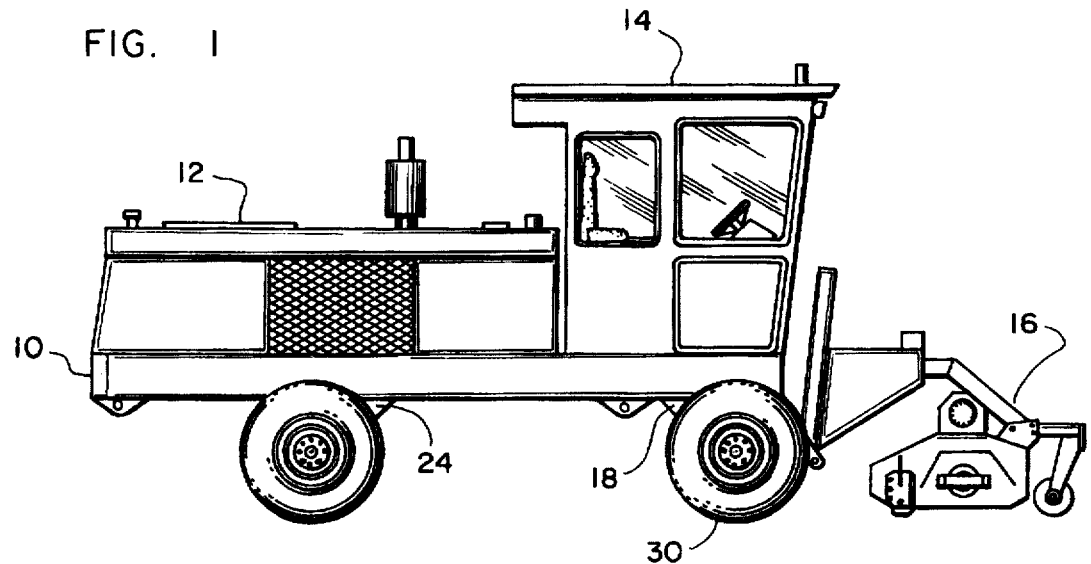
FIG. 1 is a side elevational view of a vehicle and mower attachment constructed according to principles of the invention.

Referring first to FIG. 1, there is illustrated a vehicle of the type to which the invention relates which vehicle includes a main box-shaped frame 10 that supports an engine compartment 12 and an operator's station 14. For purposes of illustration, FIG. 1 shows a front mounted mower unit 16 of any suitable type which is mounted to the vehicle in the manner described hereinafter. As will be understood by those skilled in the art, other accessories such as a snow blower, rotary broom, etc. could also be mounted in place of the mower unit 16, but the invention is directed primarily to equipment used for mowing roadside ditches and hillsides and the like, since these are the areas where the most hazardous conditions exist.

Figure 2:
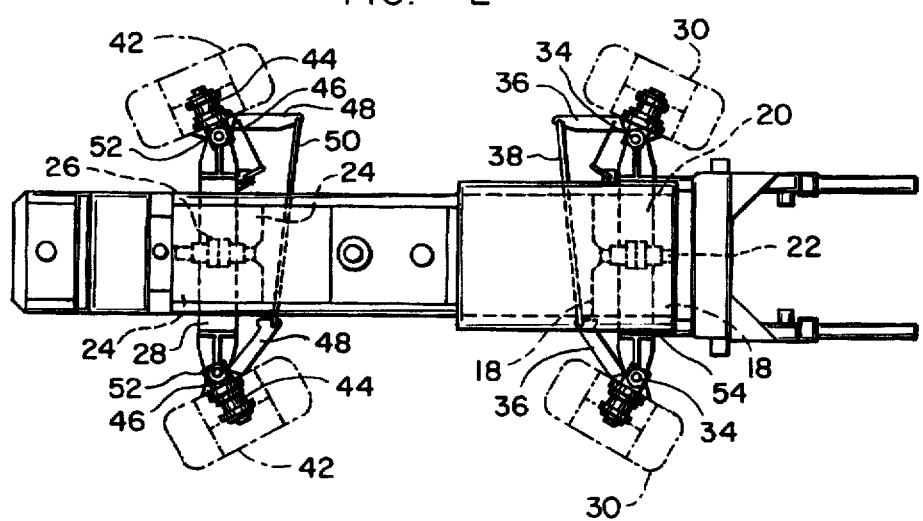
FIG. 2 is a top or plan view of the unit.

Rigidly secured to and depending from the frame 10 at the front of the frame 10 are a pair of spaced-apart front axle supports 18, the supports 18 being spaced apart from front to rear a sufficient amount to receive between them a rigid front axle 20. The front axle 20 is pivotly mounted on a shaft 22 that extends between the lower ends of the supports 18, the shaft 22 extending horizontally and substantially parallel to the frame 10. Similarly, at the rear of the frame 10 there are affixed a pair of spaced apart rear axle supports 24 which support a rear axle shaft 26 to which is pivotly mounted a rigid rear axle 28. The front axle shaft 22 and rear axle shaft 26 extend along a longitudinal center line of the frame 10 as best seen in FIG. 2.

At the outer ends of front axle 20 are front wheels 30, each of which rotates about a front wheel spindle 32 that form a part of a front wheel steering knuckle 34. Each of the front wheels 30 also is connected to a knuckle arm 36, and the knuckle arms 36 are connected by a tie rod 38 that forms a part of the vehicle hydraulic steering system in a manner well known to those skilled in the art. In addition, each of the front wheels 30 is driven independently by a hydraulic motor 40 that is integrated with hydraulic brakes (not shown). Similarly, the rear wheels 42 are mounted on rear wheel spindles 44 turnable about the outer ends of the rear axle 28. Each of the rear wheels 42 is connected to a steering knuckle 46 which in turn is connected to a knuckle arm 48 pivotly connected to a tie rod 50. In a manner similar to that of the front wheels 30, each rear wheel 42 is independently driven by a hydraulic motor 52 that is integrated with hydraulic brakes. As is well known to those skilled in the art, the hydraulic system for driving, steering and braking the vehicle can be controlled through a hydro-static pump or pumps that allow the vehicle to be driven in forward and reverse. If desired, and as is well known to those skilled in the art, the steering system can be operated in different modes to provide for four-wheel steer, crab steer, or two-wheel steer. The mower unit 16 is rigidly affixed to the front axle 20 in any suitable manner such as by mounting members 54 (see FIG. 2) so that the mower unit 16 will follow the contour of the land. The operator of the vehicle can raise and lower the mower unit 16 through use of the vehicle's hydraulic system. Pivotal movement of the front axle 20 is controlled by a hydraulic cylinder 56 (see FIG. 3). It will be understood that the rear axle 28 is free-floating and follows the contour of the land. The hydraulic cylinder 56 is pivotly mounted on a pivot 58 extending between the front axle supports 18 with the operating rod 60 of the hydraulic cylinder 56 being pivotly mounted to a pivot pin 62 extending between mounting brackets 64 affixed to the top of the front axle 20. Thus, actuation of the hydraulic cylinder 58 and extension or withdrawal of the operating rod 60 will cause the front axle 20 to pivot about the shaft 22 relative to the frame 10 and the operator's station 14. This structure will allow the frame 10 and operator's station 14 to be kept substantially horizontal regardless of the slope of any sidehill by using the control system described hereinafter.

The front axle is provided with a level sensor 66 of any suitable type. The level sensor 66 is shown schematically in FIG. 5. It will be understood by those skilled in the art that a level sensor 66 will be mounted on the front axle 20 so as to continuously sense the degree of tilt of the axle from horizontal. The signal from the sensor 66 controls the hydraulic cylinder 56 through a hydraulic valve 68, the movement of the hydraulic cylinder 56 always maintaining the operator's station 14 in an upright position and the frame 10 substantially horizontal. The sensor 66 will continuously control the follow of fluid to the hydraulic cylinder 56 to and those control the position of the frame 10 and operator's station 14 until the sensor 66 senses that the front axle 20 is at an incline from the horizontal at or above a predetermined amount. The preferred limit of incline is 30°, at which time a visual and audible warning signal 70 is actuated. At this time, the operator is cautioned to exit the operator's station 14 and move to a safe distance from the vehicle, taking with him a remote control unit 72. As illustrated in FIG. 4, by using the remote control unit 72, the operator can start and stop the engine, control the engine speed and thus the speed of the mower, and can control the direction of the mower either forward or in reverse. Similarly, the remote control unit 72 allows the operator to steer the mower, brake the mower when necessary, and also allows the operator to control the raising and lowering of the mower unit 16. The mower is designed to operate on sidehill slopes up to an absolute maximum of 37°, and if the operator ignores the signal 70 given when the slope is 30°, or if the operator heeds the signal 70 but continues to operate the mower from the remote control unit 72, the mower will automatically shut down if an incline of 37° from the horizontal is encountered. This is accomplished by a signal from the level sensor 66 that will shut off the engine ignition 73 which in turn shuts down the hydraulic system and the mower will come to a stop. If desired, a safety "dead man" switch 74 can be provided in the operator's station 14 that will also turn off the engine ignition in the event that the operator is unable to continue to operate the vehicle. If desired, a suitable override can be provided in the system.

It will be evident from the foregoing description that the invention provides a road maintenance vehicle that can be used in the wide variety of terrain encountered in roadside mowing. The vehicle can be operated safely on slopes up to 30° since the operator's station will always remain upright and stable. When an incline of the predetermined amount of 30° slope is encountered, the operator is warned, and is instructed to exit the vehicle and operate it from a remote location using a remote control unit. If the operator should ignore the warning, the vehicle will completely shut down if a slope of 37° is encountered. The vehicle of the invention is designed to operate safely within the predetermined maximum sidehill slopes, and the vehicle is totally self-leveling within these design limits. The invention thus eliminates the hazards of operating units of this type in hilly terrain, and greatly minimizes the chance of injuries to operators and damage to the equipment itself.

Having thus described the invention in connection with a preferred embodiment thereof, it will be evident to those skilled in the art that various revisions and modifications can be made to the preferred embodiment described herein without departing from the spirit and scope of the invention. It is my intention, however, that all such revisions and modifications that are obvious to those skilled in the art will be included within the scope of the following claims.

What is claimed is as follows:

1. A self-leveling vehicle for operation on uneven terrain having sidehill slopes, said vehicle comprising: a main frame having a front, a rear and sides extending between the front and rear with a center line extending from the front and rear between the sides that defines a pivotal axis, an engine supported on the main frame, an operator's station supported on the main frame, a front axle support rigidly attached to and extending downwardly from the front of the main frame, a rear axle support attached to and extending downwardly from the rear of the main frame, a front axle mounted on the front axle support for pivotal movement from side-to-side about said pivotal axis, a rear axle mounted on the rear axle support for pivotal movement independently of the first axle from side-to-side relative to the main frame about said pivotal axis, each of the front and rear axles having ground engaging wheels mounted at their outer ends, at least two of the wheels being steerable, controllable power means combined with the front axle to control the amount of pivotal movement of the front axle from side-to-side relative to the main frame, a sensor combined with the front axle to sense the side-to-side angle of incline of the front axle relative to the horizontal, first actuating means operatively connecting the sensor and the power means to actuate the power means so as to maintain the main frame in a substantially horizontal position from side-to-side at any time the side-to-side angle of incline of the front axle relative to the horizontal is less than a first predetermined amount of approximately 37°, a visual and audible signal positioned in the operator's station, second actuating means to actuate the visual and audible signal in the operator's compartment when a second predetermined amount of the angle of incline less than the first predetermined amount of the angle of incline is attained, and disabling means combined with the sensor and the engine to shut off the engine whenever the first predetermined amount of the side-to-side angle of incline of the axle to the horizontal of approximately 37° is attained.

2. The self-leveling vehicle of claim 1 in the which the second predetermined amount of the side-to-side angle of incline between the front axle and the horizontal is approximately 30°.

3. The self-leveling vehicle of claim 2 in which the ground engaging wheels mounted on both the front and rear axles are steerable, and means is provided to steer the ground engaging wheels mounted on the front axle independently of the ground engaging wheels mounted on the rear axle.

\* \* \* \* \*